United States Patent [19]
Schweizer

[11] Patent Number: 5,803,886
[45] Date of Patent: Sep. 8, 1998

[54] WORKPIECE GRIPPER

[75] Inventor: Anton Schweizer, Wurmlingen, Germany

[73] Assignee: Chiron-Werke GmbH & Co. KG, Tuttlingen, Germany

[21] Appl. No.: 804,734

[22] Filed: Feb. 21, 1997

[30] Foreign Application Priority Data

Feb. 24, 1996 [DE] Germany .................. 196 07 001.5

[51] Int. Cl.$^6$ ............................. B23Q 3/157; B66C 1/10
[52] U.S. Cl. ..................... 483/31; 483/901; 901/31; 901/37
[58] Field of Search ................... 483/14, 13, 15, 483/30, 31, 901, 902, 20; 901/37, 41, 39, 31, 22; 414/758, 763

[56] References Cited

U.S. PATENT DOCUMENTS

| | | | |
|---|---|---|---|
| 4,486,928 | 12/1984 | Tucker et al. | 483/901 |
| 4,555,844 | 12/1985 | Palfery et al. | 483/31 |
| 4,571,814 | 2/1986 | Palfery et al. | 483/14 |
| 4,574,463 | 3/1986 | Palfrey et al. | 483/14 |
| 4,608,747 | 9/1986 | Link et al. | 483/14 |
| 4,636,135 | 1/1987 | Bancon | 901/41 X |
| 4,716,647 | 1/1988 | Winkler et al. | 901/37 X |
| 4,993,139 | 2/1991 | Burry et al. | 901/41 X |

FOREIGN PATENT DOCUMENTS

| | | |
|---|---|---|
| 0 088 644 A1 | 3/1983 | European Pat. Off. . |
| 0 215 209 A2 | 3/1987 | European Pat. Off. . |
| 36 20 343 C2 | 6/1986 | Germany . |
| 195 23 787 A1 | 1/1997 | Germany . |
| 58028448 | 2/1983 | Japan . |

Primary Examiner—William R. Briggs
Attorney, Agent, or Firm—Cummings & Lockwood

[57] ABSTRACT

A workpiece gripper has a housing part on which is arranged a gripper element actuated by external force for gripping workpieces. Also provided is a joining part, for attaching the workpiece gripper to a tool holder, that can be transferred by means of a tool changing device between a magazine position on a machine tool and a working position on a receptacle in a spindle. Provided on the housing part is a connecting element that, when a tool holder is present in the receptacle, is in engagement with a joining element, to deliver energy for actuation of the gripper element, in such a way that the housing part is held nonrotatably with respect to the spindle head. An adapter is provided which is rotatably mounted on the housing part and to which the gripper element can be attached.

13 Claims, 2 Drawing Sheets

WORKPIECE GRIPPER

BACKGROUND OF THE INVENTION

1. Field of the Invention

The present invention relates to a workpiece gripper having a housing part on which is arranged a gripper element actuated by external force for gripping workpieces, and having a joining part, for attaching the workpiece gripper to a tool holder, that can be transferred by means of a tool changing device between a magazine position on a machine tool and a working position on a receptacle in a spindle of the machine tool mounted rotatably in a spindle head, there being provided on the housing part a connecting element that, when a tool holder is present in the receptacle, is in engagement with a joining element, to deliver energy for actuation of the gripper element, in such a way that the housing part is held nonrotatably with respect to the spindle head.

2. Related Prior Art

A workpiece gripper of this kind is known from U.S. Pat. No. 4,716,647.

The known workpiece gripper is provided for a machine tool with a so-called variable changing level, in which a magazine for receiving tools and workpiece grippers is displaceable together with the spindle head. The machine tool has two tool changing devices by means of which tools and/or workpiece grippers can be inserted into and removed from the receptacle in the spindle in reciprocating fashion.

Every time a new workpiece is to be delivered for machining, the known workpiece gripper is inserted into the spindle, whereupon the spindle head then first moves to the workpiece that was just machined and the workpiece gripper is actuated so that it picks up the machined workpiece. The spindle head then moves to a workpiece magazine, where the workpiece gripper sets down the finished workpiece and picks up a new workpiece for machining. The spindle head thereupon moves back into the working position, where the new workpiece is clamped in, for example, a dividing attachment. The workpiece gripper is then exchanged for the first tool to be used.

With this machine tool both the workpiece gripper and the tools are equipped with standardized tool holders having a quick-release taper. These quick-release tapers continue into a flange which has a circumferential gripper groove onto which the tool changing devices can grasp with their gripper hands and transport the tool holders. For the tool changing device, the known workpiece gripper is therefore no different from an ordinary tool.

Clamping jaws actuated by an external force, which in their closed position are preloaded by a compression spring, are provided on the workpiece changer. The clamping jaws are opened by means of an actuation fluid that is conveyed through fluid conduits provided in the housing part of the known workpiece changer. This housing part is configured in a single piece, and is configured at its upper end for attachment to the flange of the tool holder, and at its lower end to receive the clamping jaws. The said housing part moreover has at its upper end a lug into whose upper side the fluid conduit opens.

Provided on the spindle head is a corresponding joining element into which the lug engages when the workpiece changer is inserted into the receptacle of the spindle. A further fluid conduit through which the actuation fluid is conveyed to the clamping jaws, which can be opened by application of a fluid pressure, is provided in the said joining element.

The housing part is retained nonrotatably on the spindle head by means of the lug and the joining element. Rotation of the workpiece held by the workpiece changer is not possible with this design.

It is mentioned in U.S. Pat. No. 4,716,647, however, that fluid delivery can occur not via the separate lug and the joining element provided for it on the spindle head, but directly through the rotation axis of the spindle. With this design the housing part is thus not joined to the spindle head, so that by rotating the spindle, the workpiece being held can also be rotated.

Fluid delivery occurs here through the axis of the spindle and through the quick-release taper of the tool holder, so that a standardized tool holder can no longer be used. Moreover, extensive design changes to the machine tool itself are required with this design. The cited patent document does not, however, contain an exact description of how the machine tool is to be designed accordingly.

U.S. Pat. No. 4,646,422 discloses a similar design in which a workpiece changer having jaws actuated by external force is arranged on a tool holder. The tool holder is screwed into a receptacle in a spindle; an axial rod by means of which the clamping jaws of the workpiece gripper are actuated is provided in the spindle.

This design again requires a specially adapted machine tool which requires one drive system to screw the tool holder into the receptacle and a further drive system to actuate the clamping jaws, a further drive system moreover being necessary for the spindle itself.

It is disadvantageous with this arrangement as well that standardized tool holders cannot be used, and that the machine tool itself must be specially configured to receive and actuate a workpiece gripper.

On the whole, however, it is the case that machine tools of this kind are often special machines designed and procured for the particular application, for example for drilling out wheel rim holes. In order to minimize the costs of such special machines, recourse is had to standardized subassemblies, which include the spindle head with spindle mounted rotatably therein, the tool changer, the tool magazine, etc. With such special machines it is necessary for some applications to keep a workpiece gripper in reserve in the tool magazine, while for other applications the use of a workpiece gripper is not scheduled.

It is a disadvantage in this context if, with special machines of this kind, different standard subassemblies must be used if the machine is or is not using a workpiece gripper. Of course it would be possible to design each of these standard subassemblies in such a way that a workpiece gripper could be used, but because of the complicated configuration described above, this would mean that the said standard subassemblies would be more expensive overall, which would then also impact those machine tools which require no workpiece gripper at all.

Thus while the generic workpiece changer has the advantage that it can be used together with standardized subassemblies, the rotatable workpiece grippers have the advantage that the workpieces can be positioned correctly even after gripping, or can be held in the spindle even during machining. The latter case is specifically required when a rotationally symmetrical shape is to be produced on the workpiece using, for example, a cutting tooth.

An example of the use of a rotating workpiece is given in U.S. Pat. No. 4,646,422 mentioned above. The machine tool described therein is equipped with two coaxial spindles, the receptacles of which open toward one another. When the known machine is in operation, one of the spindles is in each case locked in the rotation direction, while the other spindle rotates. If a workpiece is to be, for example, lathe-turned, the workpiece holder along with the workpiece is inserted into the spindle that is free to rotate, while the tool holder, fitted with a turning tool, has been inserted into the spindle that is locked so as not to rotate. If the workpiece is to be milled, however, the arrangement is correspondingly reversed, so that the workpiece is stationary and the milling cutter rotates.

A disadvantage of such a machine tool is of course the fact that two spindles are required.

SUMMARY OF THE INVENTION

In view of the above, it is an object of the present invention to ensure by way of simple design features that the advantages of the two design variants described above can be utilized, i.e. that on the one hand standardized subassemblies can be used, and on the other hand the workpiece is rotatable.

According to the invention, this object is achieved by the fact that in the case of the workpiece gripper cited at the outset, an adapter is provided which is rotatably mounted on the housing part and to which the gripper element can be attached.

The object underlying the invention is completely achieved in this manner.

Specifically, the inventor named in the present application has recognized that, surprisingly, it is not necessary to reconfigure the machine tool in order to achieve the aforesaid combination of advantages. Instead it is possible in a simple manner to configure the tool holder in, so to speak, two parts, the one part, namely the housing part, being joined nonrotatably to the spindle head while the other part, i.e. the adapter, is rotatable with respect to the housing part and can carry corresponding gripper elements to grasp the workpieces. With this design, therefore, no additional delivery of energy through the rotation axis of the spindle, in the form of fluids or a tie rod, is necessary, so the machine tool and the tool holders themselves do not need to be modified.

It would also be possible to design the joining element provided on the spindle head so as to rotate about the spindle axis, but because this characteristic is often not needed, this would also be associated with an increase in the cost of the standardized subassemblies, which is not desirable for the reasons mentioned above. A further disadvantage of this kind of design would be that this rotatably designed joining element would be exposed to much more severe stresses than the rotatable design in the case of the workpiece gripper, since different workpiece grippers are used depending on the workpiece; in each case, however, the rotatable joining element on the spindle head would then be used.

The design selected here, in which a rotatably mounted adapter is provided on the workpiece gripper, thus results in a very simple design on which excessive demands also do not need to be made, since the workpiece gripper is generally utilized only briefly during a machining process, while the other subassemblies of the machine tool are exposed to much greater stress.

It is preferred in this context if energy for rotation of the adapter is delivered via the joining element.

The advantage here is that on the one hand the energy delivered in any case to clamp the workpieces can also be used to rotate the adapter. On the other hand, additional energy in the form of, for example, electricity can of course also be delivered. In all these cases, the adapter would be equipped, so to speak, with its own motor or its own drive system. In a very simple design, the adapter can be equipped with stops which limit its rotation range in both rotation directions, so that the rotary motion can be controlled by simply applying pressurized fluid to the adapter.

On the other hand, however, it is preferred if the joining part is mounted rotatably with respect to the housing part, and carries at one of its ends the adapter for attaching the gripper element.

The advantage here is that the spindle itself can be used as the rotary drive for the gripper element. The very precise positioning of the spindle is also utilized here, greatly reducing the design complexity of the new workpiece gripper. The reason is that the workpiece gripper now does not need to be equipped with its own motor or stops, etc., so that its overall weight will also be lower than in the case of the above-mentioned variant with separate energy delivery. This low weight yields a further advantage, since the tool changers do not need to be designed for greater mechanical stresses. The reason is that it is generally true that these tool changers achieve a very fast tool change time, which is possible only if the tools themselves have a relative low weight. Since the weight of the new workpiece changer is now similar to the weight of the tools, no particular features need to be provided on the tool changers in order, for example, to make the changing operation proceed more slowly due to the higher mass.

It is preferred in this context if the adapter is configured to accept different gripper elements.

The advantage with this feature is that the new tool changer becomes a standard part like, for example, a tool holder with quick-release taper, although a further energy delivery is provided in order to clamp and/or rotate/position the workpiece changers.

The present invention thus increases the number of standard subassemblies for such machine tools by adding one more, namely the new workpiece changer, which is inserted as a standard part between an ordinary tool holder and a particular gripper element to be adapted specifically to the workpieces.

In an embodiment, it is preferred if the housing part is retained on the joining part substantially nondisplaceably in the longitudinal direction; in a preferred embodiment, the adapter is in contact with the housing part via a sliding surface, and via that sliding surface presses the housing part toward the spindle head when the tool holder is drawn into the receptacle.

This feature is advantageous in terms of design because no additional features are necessary in order to attach the housing part to the spindle head. It would be possible to provide a locking unit, actuated by means of a separate force, between the joining element and connecting element, but like the other features described before this would require greater design complexity in the standard subassemblies. With the solution selected here, the housing part is now simply held nonrotatably by means of the joining element and connecting element, while it is retained in the axial direction by means of the drawn-in tool holder, on which the adapter is held nondisplaceably in the axial direction.

It is preferred in general if a locking device is provided by means of which the adapter can be coupled nonrotatably to the housing part, the locking unit preferably unlocking automatically when the tool holder is drawn into the receptacle.

The advantage here is that the orientation between the housing part and the tool holder is maintained when the new workpiece gripper is inserted and removed. Tool holders of this kind are often equipped with grooves on the flange which ensure correctly positioned coupling of the tool holder into the receptacle of the spindle. If the locking unit now prevents the housing part from rotating with respect to the gripper element during this coupling operation, this ensures under all circumstances that the joining element and the connecting element will mutually engage when the tool holder is drawn in. If the housing part were free to rotate, for example, it could easily happen that due to a certain radial offset between the connecting element and joining element, the desired energy transfer would not be possible, or damage to the joining element or connecting element might occur.

In an embodiment, it is preferred if the locking unit comprises a spring-loaded pin which engages, in the locked state, into a corresponding snap-in hole on the adapter; and if a lever mechanism is provided in order to adjust the pin, the lever mechanism being joined to an actuation stud which projects out of the housing part and is in contact with the spindle head when the workpiece gripper is in its working position.

This feature is advantageous in terms of design because it provides, in a simple fashion, for automatic unlocking of the locking unit.

It is preferred in general if the joining part is configured as a shaft that is mounted in a centered orifice of the housing part; if at least one fluid conduit which opens into the side of the orifice is provided in the connecting element; and if there is provided in the shaft an associated fluid conduit which at one end leads into the adapter and at the other end opens into an annular groove, provided on the shaft, which is associated with the fluid conduit in the housing part.

This feature is again advantageous from a design viewpoint, since these features allow a simple transfer of fluid energy from the joining part on the housing part to the adapter which rotates with respect thereto.

It is further preferred if a further connecting element, associated with which is a further joining element provided on the spindle head for delivering energy, is arranged on the housing part, the transfer of fluid from the housing part to the adapter part preferably occurring here in the manner described above, via fluid conduits with an annular groove.

The advantage of this feature is that the clamping jaws can be actively opened and closed, since two different fluid conduits are provided. This feature is furthermore preferred in terms of safety, since the clamping force is now provided not by a spring element, but in controlled fashion by the fluid. It is now possible, for example, to monitor by means of a pressure sensor whether the clamping jaws are actually closed. Spring-actuated clamping jaws are generally monitored by means of a sensor arranged in the region of the clamping jaws themselves, but for this purpose the sensor information must be transferred from the workpiece changer to a control unit, which entails corresponding problems. With the embodiment presented here, however, the fluid pressure can be monitored at the spindle head where fluid delivery is regulated, so that monitoring the function of the workpiece gripper also becomes globally simpler.

Further advantages are evident from the description and the attached drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is shown in the attached drawings and will be explained further in the detailed description below. In the drawings.

DESCRIPTION OF A PREFERRED EMBODIMENT

Figure 1:
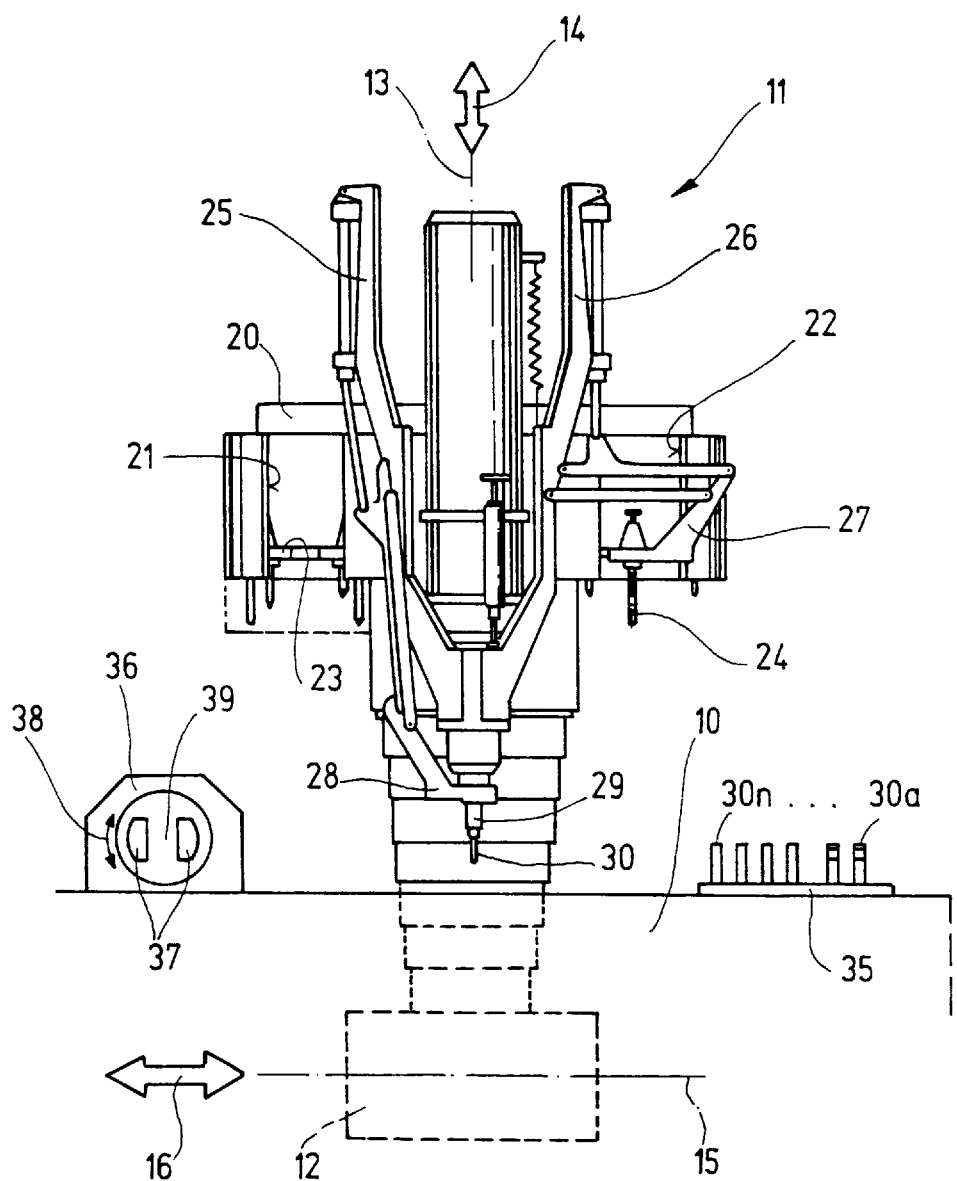
FIG. 1 shows a schematic overall view of an embodiment of a machine tool on which the workpiece gripper according to the invention can be used.

In FIG. 1, 10 designates a table of a machine tool. The machine tool has a spindle head 11 that can be moved by means of a schematically indicated drive system 12 in a vertical axis 13 in the direction of a double arrow 14, in a longitudinal axis in the direction of a double arrow 16, and in an axis perpendicular to axes 13 and 15.

Arranged around spindle head 11 is a horseshoe-shaped magazine 20, the two front ends of which are visible on either side of spindle head 11 in the front view in FIG. 1. Magazine 20 has openings 21, 22 in the region of these ends, a portion of an endless conveyor belt 23 being visible in the left-hand opening 21. With conveyor belt 23, tools 24 can be conveyed along a double-horseshoe-shaped track in magazine 20 so that they are available, under appropriate control, at openings 21, 22 for removal from or reinsertion into magazine 20.

A left-hand tool changer 25 and a right-hand tool changer 26 are arranged on spindle head 11 in such a way that spindle head 11, magazine 20, and tool changers 25, 26 are moved uniformly by drive system 12. The result is therefore a variable tool changing level which reduces tooling times during the tool change.

In FIG. 1, right-hand tool changer 26 is in its magazine position in which, at its gripper hand 27, it has just removed a tool 24 from magazine 20 or is just inserting it.

The left-hand tool changing device 25 is in its working position in which it is holding a workpiece gripper 29. A workpiece 30 is visible at the lower end of workpiece gripper 29.

Located to the right on table 10 is a pallet 35 with further workpieces 30a–30n. Located on the left side of spindle head 11 is a dividing attachment 36 with a jaw chuck 37 that is rotatable, in the direction of an arrow 38, about an axis 39 that extends perpendicular to the drawing plane.

The machine tool according to FIG. 1 as so far described operates as follows:

When the machine tool is started up, both tool changing devices 25, 26 are in their magazine positions and pallet 35 is populated with unmachined workpieces 30a–30n.

Conveyor belt 23 is then moved so that workpiece gripper 29 can be picked up by one of tool changing devices 25 or 26 and transferred into the working position. The workpiece gripper is then clamped in the spindle mounted rotatably on spindle head 11, whereupon spindle head 11 is moved so that workpiece gripper 29 can pick up one of workpieces 30a–30n from pallet 35. Once workpiece 30 has been grasped, it is moved to dividing attachment 36.

During these operations, the other tool changing device 26 or 25 has removed the first required tool 24 from magazine 20 and is standing ready in the magazine position. As soon as workpiece 30 has been inserted by means of workpiece gripper 29 into jaw chuck 37, workpiece gripper 29 is then unclamped from the spindle and replaced by tool 24 by means of a reciprocal motion of tool changing devices 25, 26.

The desired tools 24 are then inserted correspondingly in succession until all the machining operations have been performed. In order then to change tool 30, the workpiece changer is once again inserted into the spindle and workpiece 30 is exchanged for a new workpiece 30 from pallet 35. These operations repeat cyclically until all workpieces 30a–30n have been machined.

The machine tool described so far corresponds to the machine tool disclosed in U.S. Pat. No. 4,716,647 mentioned at the outset, express reference being made to that patent document with respect to further information.

Figure 2:
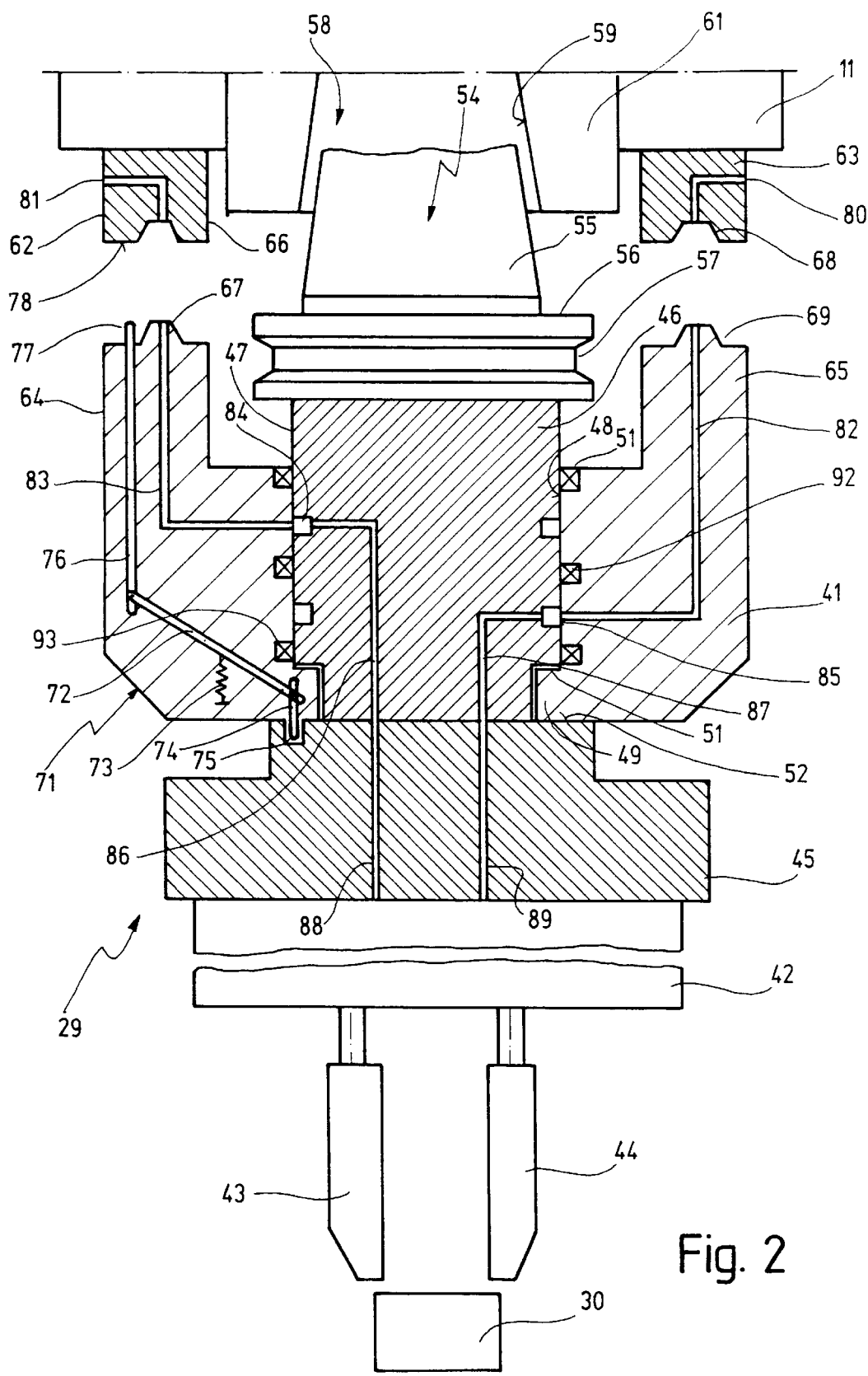
FIG. 2 shows, in a greatly enlarged illustration, a workpiece gripper according to the invention that can be inserted into the spindle head of the machine tool shown in FIG. 1.

FIG. 2 now shows, in a longitudinal section, new workpiece gripper 29 as well as portions of the lower region of spindle head 11. New workpiece gripper 29 makes it possible to rotate workpiece 30 as desired after it is grasped, so that it can be clamped in different orientations in dividing attachment 36.

New workpiece gripper 29 comprises a housing part 41 on which a gripper element 42, which has two clamping jaws 43 and 44 for grasping workpiece 30, is rotatably arranged. Gripper element 42 is attached to an adapter 45 that is rotatably mounted on housing part 41 and is in turn attached to a joining part 46 that extends, in the manner of a shaft 47, through a centered orifice 48 in housing part 41.

Housing part 41 has at its lower end a collar 49 by means of which it is held, nondisplaceably in the axial direction, between a shoulder 51 of shaft 47 and a sliding surface 52 of adapter 45.

At the upper end remote from shoulder 51, shaft 47 is attached to a standardized tool holder 54 with a quick-release taper 55 and flange 56. A gripper groove 57 onto which tool changing devices 25, 26 grasp with their gripper hands 27, 28 is shown on flange 56.

Schematically indicated above workpiece gripper 29 is the lower region of spindle head 11, which has a receptacle 58 with an internal taper 59 for quick-release taper 55, said receptacle 58 being provided in a spindle 61 mounted rotatably on spindle head 11.

Two joining elements 62, 63, associated with which are connecting elements 64, 65 on housing part 41, are arranged on spindle head 11 alongside spindle 61. Joining elements 62, 63 and connecting elements 64, 65 are equipped with plug-in parts 66, 68, 67, 69 which, when workpiece gripper 29 is inserted with its quick-release taper 55 into receptacle 58, come into mutual engagement and retain housing part 41 nonrotatably on spindle head 11.

On the left in FIG. 2 it is evident that a locking unit 71, by means of which adapter 45 can be locked nonrotatably to housing part 41, is provided in housing part 41. Locking unit 71 comprises a lever 72 that is mounted pivotedly and approximately centeredly, and has on its right-hand arm a tension spring 73 and a pin 74 with which a snap-in hole 75 in adapter 45 is associated.

On its left-hand arm, lever 72 is equipped with an actuation stud 76 whose upper end 77 projects out of connecting element 64 and which, when workpiece gripper 49 is inserted into receptacle 58, comes into contact with joining element 62 with a contact surface 78.

During this insertion movement, actuation stud 76 is pressed downward in FIG. 2 so that lever 72 pivots and thereby lifts pin 74, against the force of tension spring 73, out of snap-in hole 75, so that a relative rotation between housing part 41 and adapter 45 is now possible.

In this position quick-release taper 55 is drawn into receptacle 58, by means of a tie rod known per se, in such a way that it is joined nonrotatably to spindle 61. Because of the nonrotatable retention of housing part 41 on spindle head 11, and the possibility of rotation between adapter 45 and housing part 41, gripper element 42 can now be rotated as desired by a rotation of spindle 61, while housing 41 remains stationary.

Clamping jaws 43, 44 are clamping jaws actuated by external force and are actuated by means of a fluid, as described in detail in, for example, U.S. Pat. No. 4,716,647 mentioned before.

Fluid delivery occurs via fluid conduits 80, 81 that are provided in locking elements 63 and 62, respectively, on spindle head 11. Associated with fluid conduits 80, 81 are fluid conduits 82, 83 in connecting elements 65, 64. When plug-in parts 66, 67, 68, 69 are in mutual engagement, fluid thus passes from spindle head 11 into housing part 41.

Fluid conduits 82 and 83 open into orifice 48 of housing part 41 at the level of annular grooves 84 and 85 which are provided radially and externally on shaft 47.

From these annular grooves 84, 85, further fluid conduits 86, 87 extend through shaft 47 and ultimately come into fluid connection with fluid conduits 88, 89 in adapter part 45. These fluid conduits now transfer energy to clamping jaws 43 and 44, which can thus be actively opened and closed.

Also provided between housing part 41 and shaft 47 are seals 91, 92, 93 which seal the two aforementioned fluid connections externally and with respect to one another.

Lastly, it should be mentioned that because of the tension exerted on quick-release taper 55 when it is drawn into receptacle 58, a pressure is exerted on housing part 41 via sliding surface 52, thus resulting in solid contact between plug-in parts 66, 67, 68, 69.

For purposes of clarity, the manner in which gripper element is attached to adapter 45, and the latter to shaft 47, is not shown in FIG. 2. This attachment is accomplished, for example, by means of normal machine bolts which are not visible in the illustration selected in FIG. 2. A variety of gripper elements 42 can now be attached to rotatable adapter 45 by means of this threaded connection. On the other hand, it is also possible to attach a variety of tool holders 54 to new workpiece gripper 29, so that new workpiece gripper 29 can coact with a variety of standard subassemblies.

Simply for the sake of completeness, it should be mentioned that new workpiece gripper 29 can also be used with machine tools which have a larger number of tool changing devices arranged in circular form around the spindle head, no separate tool magazine then being required. Instead, the tool changing devices continuously hold the tools, and optionally the new workpiece gripper, in their gripper hands, so that all the tool changing devices but one are in their magazine positions during operation.

I claim:

1. A workpiece gripper for gripping workpieces at a machine tool having a spindle head and a spindle mounted rotatably in said spindle head, said spindle having a receptacle for receiving tool holders, comprising:

a housing part, an adapter rotatably mounted on said housing part, a gripper element arranged on said adapter for gripping said workpieces, a joining part arranged at said housing part for attaching said workpiece gripper to a tool holder, said tool holder designed to be transferred between a magazine position on said machine tool and a working position at said receptacle, and a connecting element provided at the housing part and assigned to a joining element arranged non-rotatably with respect to said spindle head such, that the connecting element is in engagement with the joining element when the tool holder is inserted into the receptacle, such that the housing part is held nonrotatably with respect to the spindle head, said connecting element and joining element provided for delivering energy for actuation of the gripper element.

2. The workpiece gripper of claim 1, wherein energy for rotation of the adapter is delivered via the joining element.

3. The workpiece gripper of claim 1, wherein the joining part is mounted rotatably with respect to the housing part, and carries at one of its ends the adapter for attaching the gripper element.

4. The workpiece gripper of claim 1, wherein the adapter is configured to accept different gripper elements.

5. The workpiece gripper of claim 1, wherein the housing part is retained on the joining part substantially non-displaceably in the longitudinal direction.

6. The workpiece gripper of claim 3, wherein the adapter is in contact with the housing part via a sliding surface, and via the sliding surface presses the housing part toward the spindle head when the tool holder is drawn into the receptacle.

7. The workpiece gripper of claim 1, wherein a locking device is provided by means of which the adapter can be coupled nonrotatably to the housing part.

8. The workpiece gripper of claim 7, wherein the locking unit unlocks automatically when the tool holder is drawn into the receptacle.

9. The workpiece gripper of claim 8, wherein the locking unit comprises a spring-loaded pin which engages, in the locked state, into a corresponding snap-in hole on the adapter; and a lever mechanism is provided in order to adjust the pin, the lever mechanism coacting with an actuation stud which projects out of the housing part and is in contact with the spindle head when the workpiece gripper is in its working position.

10. The workpiece gripper of claim 3, wherein the joining part is configured as a shaft that is mounted in a centered orifice of the housing part; at least one fluid conduit which opens into the side of the orifice is provided in the connecting element; and wherein there is provided in the shaft an associated fluid conduit which at one end leads into the adapter and at the other end opens into an annular groove provided on the shaft, which is associated with the fluid conduit in the housing part.

11. The workpiece gripper of claim 1, wherein a further connecting element, associated with which is a further joining element provided on the spindle head for delivering energy, is arranged on the housing part.

12. The workpiece gripper of claim 10, wherein a further connecting element, associated with which is a further joining element provided on the spindle head for delivering energy, is arranged on the housing part.

13. The workpiece gripper of claim 12, wherein at least one further fluid conduit which opens into the side of the orifice is provided in the connecting element; and wherein there is provided in the shaft an associated further fluid conduit which at one end leads into the adapter and at the other end opens into a further annular groove, provided on the shaft, which is associated with the further fluid conduit in the housing part.

* * * * *